United States Patent [19]

White

[11] 4,349,598
[45] Sep. 14, 1982

[54] HIGH INCIDENCE ANGLE RETROREFLECTIVE MATERIAL

[75] Inventor: Michael L. White, Morrisville, Pa.

[73] Assignee: Minnesota Mining and Manufacturing Company, St. Paul, Minn.

[21] Appl. No.: 746,281

[22] Filed: Dec. 1, 1976

[51] Int. Cl.$^3$ .............................................. B32B 3/30
[52] U.S. Cl. .................................... 428/161; 428/178; 428/332; 428/337; 428/913; 350/286; 350/292; 350/102
[58] Field of Search ............... 428/156, 161, 166, 172, 428/178, 188, 913, 332, 337; 350/102, 103, 109, 288, 292, 105, 97, 286; 404/93, 94, 12, 13, 14, 9, 97; 264/1

[56] References Cited

U.S. PATENT DOCUMENTS

| | | | |
|---|---|---|---|
| 2,911,682 | 11/1959 | Ewald | 264/220 |
| 3,450,459 | 6/1978 | Haggerty | 350/103 |
| 3,541,606 | 11/1970 | Heenan et al. | 350/103 |
| 3,712,706 | 1/1973 | Stamm | 350/103 |
| 3,716,445 | 2/1973 | Lemelson | 350/102 |
| 3,923,378 | 12/1975 | Heenan | 350/103 |
| 3,935,359 | 1/1976 | Rowland | 428/913 |
| 3,962,402 | 12/1975 | Heenan | 425/808 |
| 4,066,331 | 1/1978 | Lindner | 350/103 |

Primary Examiner—Stanley S. Silverman
Attorney, Agent, or Firm—C. Alexander; D. M. Sell; R. R. Tamte

[57] ABSTRACT

Retroreflective film, sheeting or the like having an array of light-reflecting right triangle prisms between a transparent surface layer and a backing layer. The opposing triangular end faces of adjacent prisms are spaced apart to provide internal reflection therefrom. The retroreflective material provides efficient retroreflection at angles of incidence of about 30°–85° and therefore is effective where light is directed in a path nearly parallel to a reflective surface, such as highway lane dividers or guardrail markers placed parallel to a highway. Retroreflective material on such markers becomes visible to an observer while yet remote from the markers.

10 Claims, 9 Drawing Figures

U.S. Patent  Sep. 14, 1982  Sheet 1 of 3  4,349,598
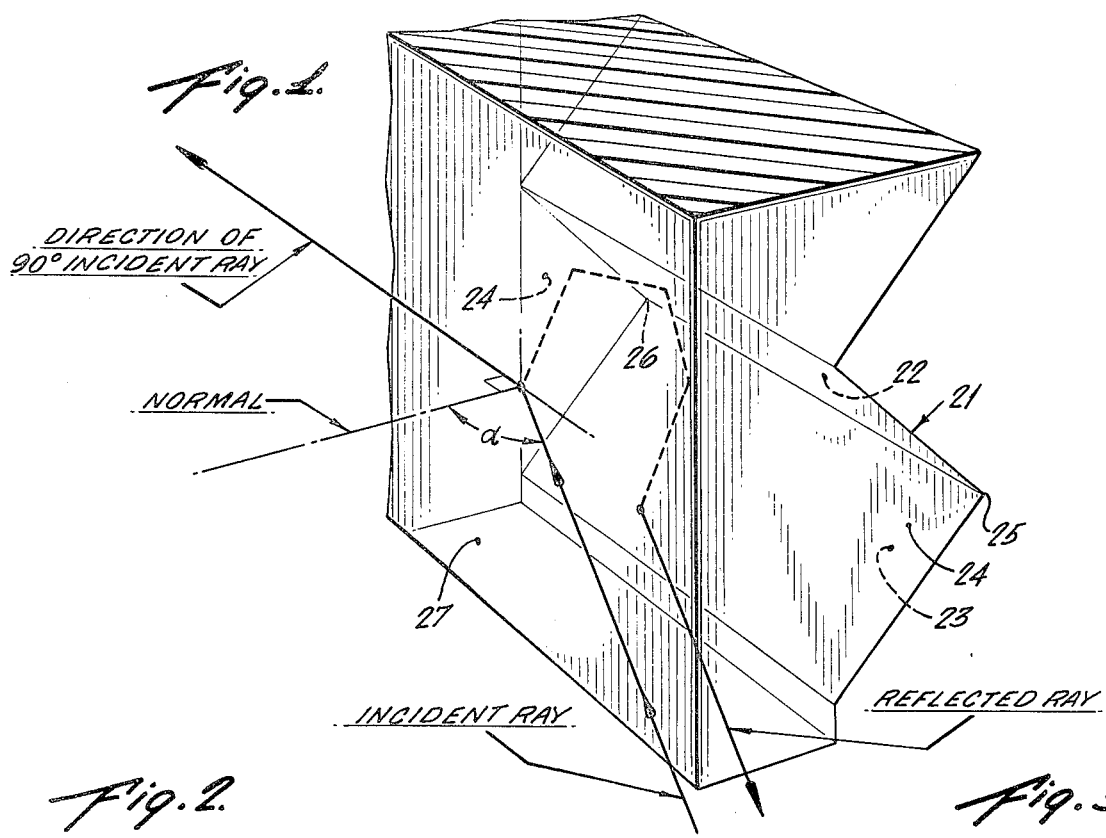
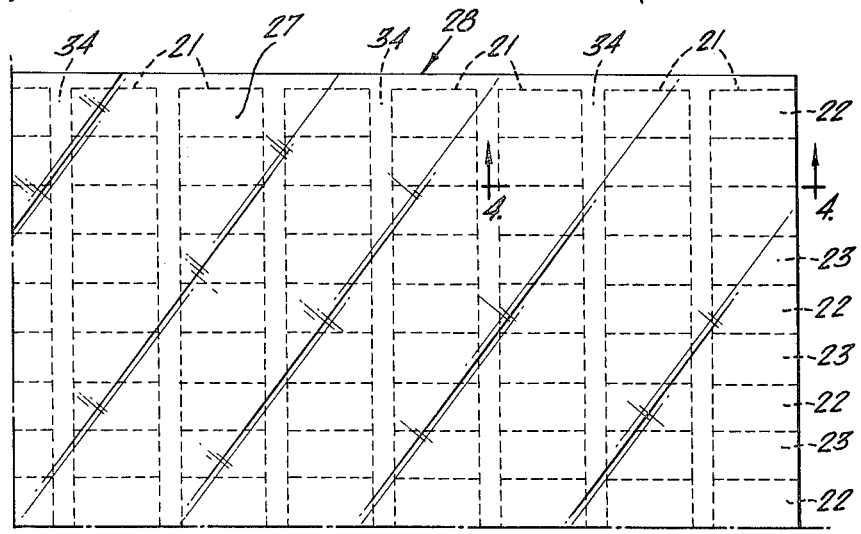
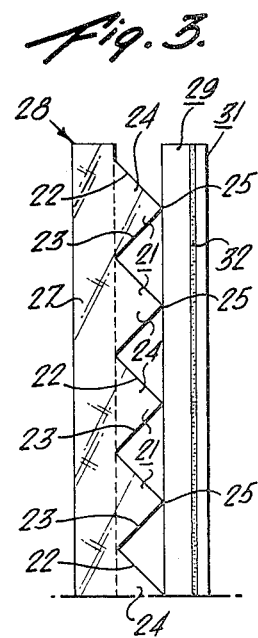
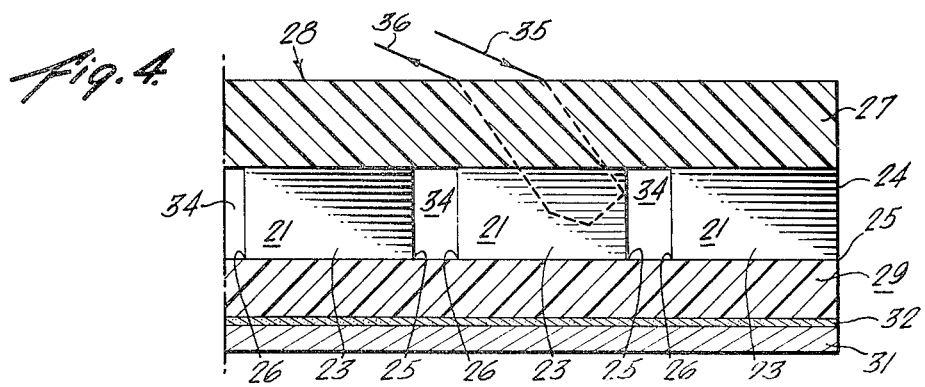

HIGH INCIDENCE ANGLE RETROREFLECTIVE MATERIAL

BACKGROUND OF THE INVENTION

This invention relates to retroreflective materials which are effective at high angles of incidence. More particularly, this invention relates to retroreflective material such as sheeting or film useful for marking surfaces which are positioned nearly parallel to light rays directed towards the surfaces.

Roadway markings, such as highway delineators, are commonly positioned parallel to the direction of roadway traffic. In such situations, reflection is maximum when incident light and the line of sight are perpendicular or nearly perpendicular to the surface of the reflective material. Although bead type retroreflective materials provide some degree of multi-directional retroreflectivity, the brilliance of the reflection does not adequately compare with that of cube corner type reflectors. The latter have directed retroreflectivity, that is, have the capability of high brilliance within a zone determined by the particular cube corner design. Whether of the cube corner or bead type retroreflective nature, retroreflective materials available to date exhibit progressively less reflectivity as the incidence angle of viewing light is increased. Generally, such materials lose nearly all of their reflectivity when the incidence angle becomes greater than about 60°. Moreover, these materials are often dimensionally unstable, undergoing delamination under wet or changing weather conditions.

Representative of the present state of the art are U.S. Pat. Nos. 2,310,790 to Jungersen and 3,450,459 to Haggerty. Jungersen describes the use of mixed retroreflective elements or off-center cube corner elements (FIGS. 10-12, 15-16) to solve the problem of poor retroreflectivity at high incidence angles. Haggerty teaches the use of multi-faceted retroreflective elements to achieve reflection at high incidence angles. However, these approaches require a combination of different retroreflective elements and therefore are complex and tend to be difficult and expensive to achieve in practice.

The present invention provides a new and improved, dimensionally stable retroreflective material based upon retroreflective elements of a simple and single design. Such elements may be incorporated into films, sheeting or like materials, and are effective in any circumstance where it is desired to obtain reflection from a surface which is nearly parallel to incident light. As opposed to the "facing" retroreflectivity of conventional cube corner materials, the retroreflective materials of the invention provide highly efficient "grazing angle" retroreflectivity, achieving maximum retroreflectivity at angles of incidence of about 45°-80°.

SUMMARY

Briefly, the retroreflective material of the invention comprises the combination of a transparent surface layer, a backing layer, and an array of reflecting elements uniformly distributed between the layers. The reflecting elements are reflecting right triangle prisms, that is, transparent bodies having a rectangular base, two mutually perpendicular rectangular faces meeting the base at 45° angles, and two parallel triangular faces perpendicular to the rectangular faces. The triangular and rectangular faces thus together define a pair of cube corner retroreflectors. The reflecting elements are arranged with their bases parallel to or coincident with the surface layer and their cube corners adjacent to or directed toward the backing layer. Opposing triangular faces of adjacent reflecting elements are spaced apart to permit internal reflection from the triangular and adjacent rectangular faces.

DETAILED DESCRIPTION

The invention will be more particularly described and understood with reference to the attached drawing wherein:

FIG. 1 is a fragmentary, partly schematic, perspective view of reflecting elements of the invention;

FIG. 2 is a fragmentary, plan view of one embodiment of reflective material of the invention;

FIG. 3 is a side elevation of the material of FIG. 2;

FIG. 4 is a vertical section along the line 4—4 of FIG. 2;

Figure 5:
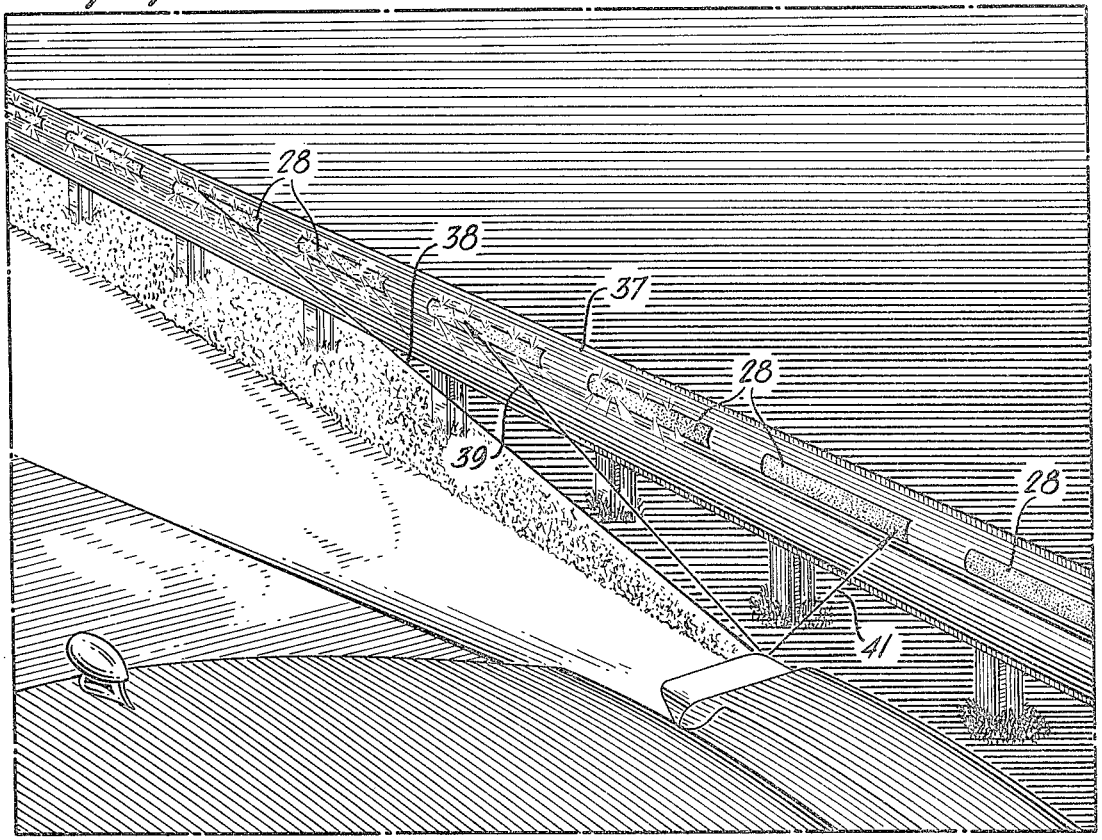
FIG. 5 is a perspective view of a roadway scene illustrating use of retroreflective material of the invention.

In FIG. 1 a unit reflecting element 21 is illustrated without a backing layer. Reflecting element 21, also known as a reflecting right triangle prism, has a rectangular base, two mutually perpendicular rectangular faces 22 and 23 meeting the base at 45° angles, and two parallel triangular faces 24 perpendicular to rectangular faces 22 and 23. The apexes 25 and 26 thus formed by the rectangular and triangular faces are the apexes of a pair of cube corner reflecting elements. Cube corner reflecting elements have the property of retroreflection, that is, the capability of reflecting light essentially back to its source.

The base of the element 21 is adjacent a transparent surface layer 27. As shown in FIG. 1, an incident ray, arriving at surface layer 27 at an angle of incidence $\alpha$, is refracted upon entry into the surface layer 27 and is then internally reflected from surfaces of the reflecting element 21. Since the reflecting surfaces of the element 21 define a pair of cube corner reflecting elements, the result is a ray which is refracted upon exiting from surface layer 27 and then retroreflected.

In the embodiment of unit reflecting element 21 shown, the surface layer 27 has the same refractive index as the reflecting element 21 and is unitary with the reflecting element, such that the pattern of retroreflection is relatively simple. While unit reflecting elements and surface layer materials may be chosen having different refractive indices, and the construction need not be unitary, different refractive indices complicate the design. It is preferred to utilize unit reflecting elements and surface layer materials of the same refractive index. Furthermore, it is practical and desirable to manufacture the array of reflecting elements 21 and the surface layer as a unitary construction, such as in the manners described below.

FIGS. 2-4 illustrate one embodiment of retroreflective material 28 of the invention. In this embodiment, the construction is essentially planar although, depending upon choice of material for each of the layers and the reflecting elements, the materials may have sufficient flexibility to enable it to be formed into a roll and made to conform to curved or irregular supporting surfaces. In this embodiment a plurality of reflecting elements 21 are arrayed in close packed rows with their rectangular bases adjacent the surface layer 27 and with the apexes of the cube corner elements, such as apex 25, adjacent or facing the backing layer 29. Suitable backing layer materials are any transparent or opaque, including colored or non-colored, materials which can sealingly engage the reflecting elements 21. Useful materials for any of the layers and reflecting elements include both organic and inorganic materials such as glass and plastics. Preferably, the materials are thermoplastic and have good weathering qualities. Acrylic plastics are particularly desirable. If extra toughness is required, a polycarbonate or polybutyrate plastic is useful.

If it is desired to adhere the retroreflective composite material to a supporting surface, it can be further backed with a release sheet 31 over a contact adhesive 32 such as an acrylic or the like.

In all retroreflective materials of the invention, the reflecting elements 21 are spaced apart by channels or grooves 34, with respect to opposing triangular faces of the reflective elements. Channels 34 provide air pockets to facilitate internal reflection from end faces 24, thus avoiding need for forming a reflective surface by metallizing the exterior faces of the reflective elements.

The paths of incident light 35 and retroreflected light 36 are shown in FIG. 4 together with refraction upon entry and exiting from surface layer 27, and a path of internal reflection.

FIG. 5 illustrates a practical application of retroreflective materials of the invention. Highway roadside or bridge delineators commonly are reflective devices mounted to face the flow of traffic, i.e., at right angles to the roadway. Conventional reflectors if mounted flush and parallel to surfaces of a guardrail or bridge exhibit poor retroreflectivity since they do not face oncoming traffic. FIG. 5 illustrates the advantages of retroreflective materials of the invention over conventional reflective materials. Since the retroreflective material of the invention is most effective when the surface of the material is approximately parallel to viewing light, it may be fastened directly on or flush to a permanent roadside structure such as a guardrail 37. Illumination 38 from highway traffic will then be reflected from the retroreflective material 28 with maximum brilliance when the angle of incidence is between about 45° and 85°, preferably about 60°–80°, including retroreflection from light rays in fringe areas of illumination, such as from light ray 39. Retroreflective materials of the invention thus may be designed to maximize retroreflectivity at such angles or any other desired high angle of incidence. As illustrated in FIG. 5 however, as viewing light and the line of sight approach 0° incidence, such as line of sight 41, retroreflectivity diminishes and disappears.

Because the reflective materials of the invention can be mounted parallel or flush to a surface, auxiliary mounting devices such as the right angle brackets commonly used to support conventional reflecting materials may be eliminated. The materials of the invention may be affixed directly to a surface by a contact adhesive or the like.

Figure 6:
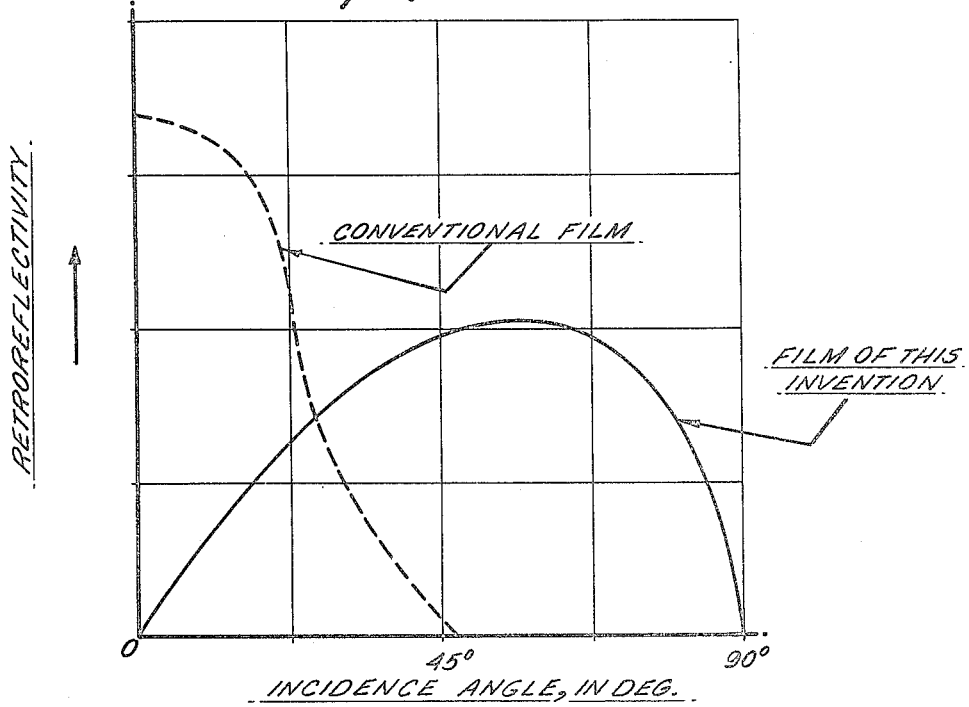
FIG. 6 is a plot comparing retroreflective efficiency of a material of the invention with conventional retroreflective material.

FIG. 6 compares a conventional cube corner film and a film incorporating a retroreflective material of this invention with respect to retroreflectivity as a function of incidence angle. A typical unit of retroreflectivity is candlepower per foot candle per foot squared. Conventional cube corner films incorporate triangular or square faced reflecting surfaces such as described in U.S. Pat. Nos. 2,310,790 (FIGS. 1–9) and 3,712,706. Absolute values of retroreflectivity are not indicated in the plot since such values will be on different scales depending on the specific cube corner configuration. However, the shape of the curve generally represents the comparison being made.

As shown in the plot, for reflecting elements of the same refractive index (about 1.5) maximum retroreflectivity in the case of a conventional cube corner retroreflector is obtained at low angles of incidence, of the order of about 0°–30°. The retroreflected energy falls to zero at about 45° incidence angle. In the case of films utilizing retroreflecting materials of the invention, retroreflectivity initially increases with the angle of incidence, reaching a maximum at about 60°–80°, and then diminishes as the angle of incidence approaches 90°. Of course, as retroreflection decreases, specular reflection increases. Moreover, as the angle of incidence approaches 0°, light entering the reflecting elements is not reflected to any substantial extent from the triangular reflecting faces of the elements. That is, the reflection from the cube corner reflecting portions of the elements is diminished or lost.

In practice, the foregoing analysis indicates that a conventional cube corner film will not provide retroreflectivity when positioned substantially parallel to the path of viewing light whereas retroreflective material of the invention will provide substantial retroreflectivity, falling off only as the angle of incidence approaches 0° to 90°.

The retroreflective materials of the invention may be prepared in a variety of ways, including embossment, casting, stamping, or by any other means of forming patterns in or with a transparent plastic material. Typical of such techniques are those disclosed in U.S. Pat. Nos. 2,310,790, 3,957,616 and 3,689,346.

In one such manufacturing technique, a master mold is formed by machining parallel V-grooves into the smooth horizontal surface of a metal block. Each side of the V-grooves is cut at 45° from the vertical. Typically, the grooves may be cut to a depth d, a width w of about 2 d, and with center-to-center spacing also of about 2 d, where d is about 2–200 mils, preferably about 4–20 mils. Parallel rectangular channels of depth d, width S of about 1/10 d to about 3 d, and center-to-center spacing L of about 1 d to about 3 d are then cut at right angles to the V-grooves. The walls of the channels cut in this fashion thus form the opposing triangular faces of reflecting elements, such as the face 24 of FIGS. 1, 3 and 4. The channels also define the length l of the individual reflecting elements, such as the elements 21 of FIGS. 1–4.

The resulting mold then serves as a master mold for the manufacture of negative molds, and then duplicates of the master mold can be made from the negative molds by electroforming or other well-known techniques for mold duplication. A transparent plastic film or sheet is then pressed against the duplicate mold or die to form or emboss in film or sheet the pattern of the master mold. By controlling the depth of the impression on the plastic film or sheet, the base portion of the film or sheet which does not receive the mold impression then becomes the transparent surface layer for the resulting retroreflective material, such as layer 27 of FIGS. 1-4.

In the next step of fabrication, the composite of reflecting elements and transparent surface layer is backed with a layer of material to strengthen the composite and to protect the reflecting elements from dirt and moisture. Typically, the backing layer is an opaque thermoplastic film or sheet, preferably one having good weathering properties. Suitable materials are acrylic polymer films of thickness about equal to the thickness of the reflecting elements. Other thicknesses are also suitable, depending on the degree of flexibility desired. The backing film or sheet may be sealed in a grid pattern or in any other suitable manner to the reflecting elements, such as by use of an adhesive or by heat sealing at discrete locations on the array of reflecting elements, so as to prevent entry of soil and moisture and to preserve the air spaces around the cube corner reflecting surfaces. If added strength or toughness is required in the composite, backing sheets of polycarbonate, polybutyrate or fiber-reinforced plastic may be used. Depending upon the degree of flexibility of the resulting retroreflective material, the material may be rolled or cut into strips or other suitable designs. The retroreflective material may also be backed with an adhesive and release sheet to render it useful for application to any substrate without the added step of applying an adhesive or using other fastening means.

A typical retroreflective material fabricated as described above may contain reflecting elements having a depth (d) of about 4 mils, a width (w) of about 8 mils, and a length (l) of about 7.2 mils. A typical width (S) of the rectangular channels 34 is about 1.6 mils and a typical center-to-center spacing (L) of the channels is 8.8 mils. The thickness of the surface layer and the backing layer may be about the same, for example, about 4 mils. It will be understood, however, that such dimensions as well as the selection of materials of the foregoing constructions will depend upon a number of factors, such as the refractive index of the material, flexibility and weathering properties of the materials, and the ultimate use for which the retroreflective material is destined.

Figure 7:
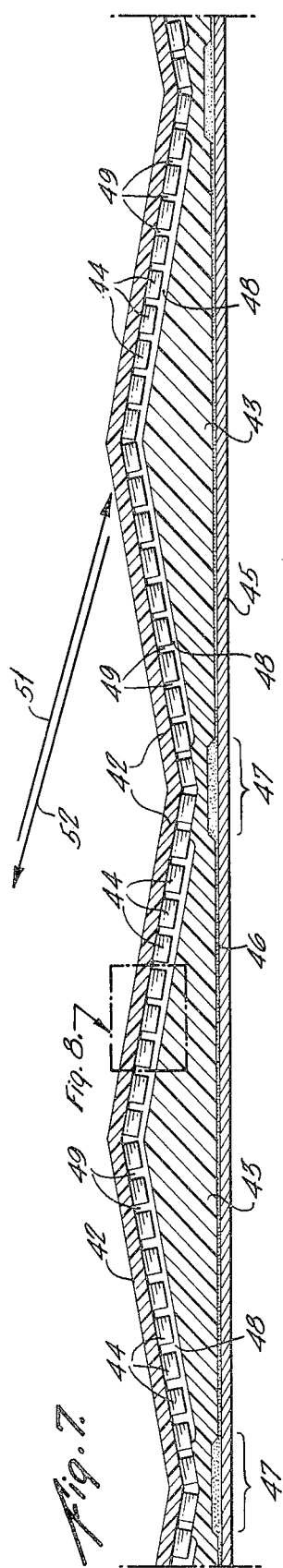
FIG. 7 is a vertical section of another embodiment of retroreflective material of the invention.
Figure 8:
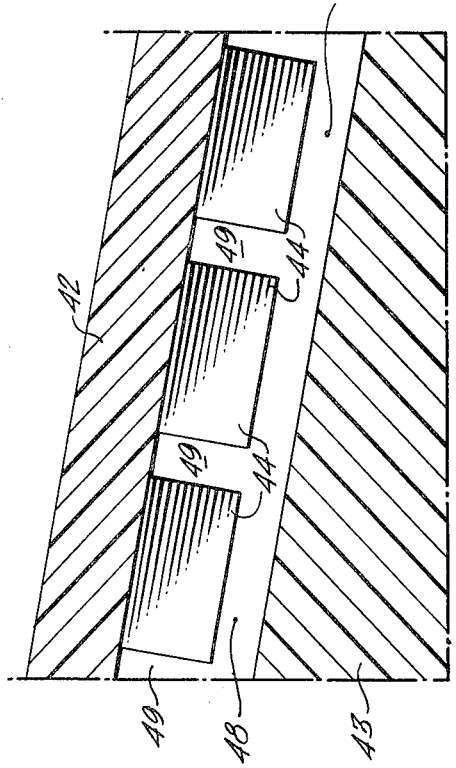
FIG. 8 is a detail of a portion of the retroreflective material illustrated in FIG. 7.
Figure 9:
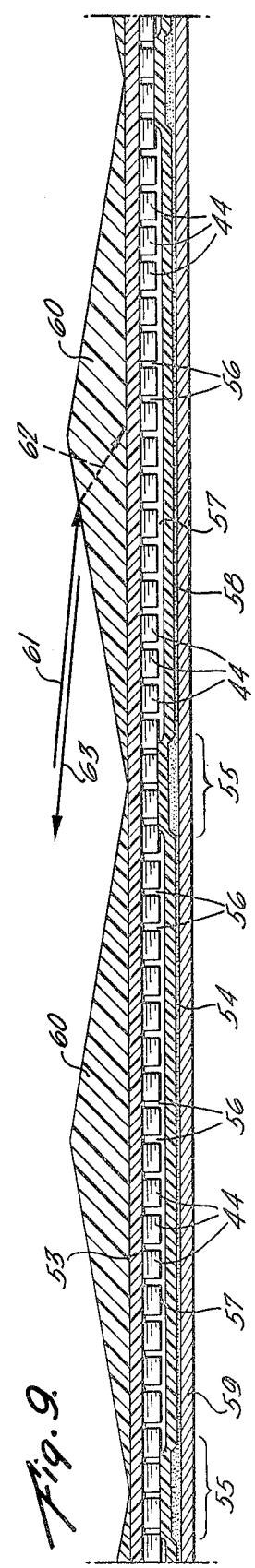
FIG. 9 is a vertical section of still another embodiment of retroreflective material of the invention.

FIGS. 7-9 illustrate other embodiments of retroreflective material of the invention. With respect to FIGS. 7 and 8, there is sandwiched between a transparent surface layer 42 and a backing layer 43 an array of reflecting elements 44 of the type described with reference to FIGS. 1-4. Optionally, the structure may include a release sheet 45 adhered to backing layer 43 with a suitable contact adhesive 46. The composite of surface layer 42, backing layer 43 and array of reflecting elements 44 is consolidated in any suitable manner such as by lamination or heat sealing at discrete locations 47. As in the composite of FIGS. 1-4, the retroreflective material of FIG. 7 contains air pockets 48 in those locations where the backing layer 43 is not sealed to the array of reflecting elements 44, and in the transverse channels 49.

Whereas the retroreflective material of FIGS. 1-4 is substantially planar, the composite of FIG. 7 has an undulating surface configuration resulting from undulations of backing layer 43 and tilting of portions of the array of prisms 44. The undulating design has the advantage over the planar configuration of FIGS. 2-4 that retroreflection in the case of the design of FIG. 7 will be more pronounced from greater viewing distances than in the case of the planar configuration. This is a consequence of the fact that the angle of incidence of a light ray 51 from a distant viewing point is less in the case of the construction of FIG. 7 than in the case of the constructions of FIGS. 1-4, so that there will be a greater chance of maximum retroreflectivity (ray 52), as indicated in the plot of FIG. 6. Moreover, as the incidence angle is increased, specular reflection is decreased, resulting in more brilliant retroreflection. For example, it is calculated that whereas about 95% of incidence light would be reflected (rather than refracted into the reflecting elements 44) from the surface at 89° incidence, only about 40% of the incident light will be reflected from the transparent surface layer at 80° incidence. Of course, the angle of incidence should not be decreased to more than about 30°-45° since retroreflection will also decrease, as shown in the plot of FIG. 6.

The dimensions and form of the undulations are not critical. They may be curved or triangular in cross-section, and their period and amplitude may be regular or irregular. Typically, the undulations will have a period of about 100-300 mils, an amplitude of about 5-15 mils, and an elevation of about 2-20 degrees, thereby permitting a reduction of about 2-20 degrees in angle of incidence.

An undulating pattern may be achieved in other ways, such as illustrated in FIG. 9. With reference thereto, reflecting elements 44 are sealed between a transparent surface layer 53 and a backing layer 54, essentially as described with reference to FIGS. 1-4. Adhesion of the backing layer 54 may be along the entire lower apexes of reflecting elements 44 or sealing may be localized at locations 55, as shown. Whereas air pockets 56 will result in any case, air pockets 57 will occur only upon local sealing. As in the embodiments of FIGS. 2-8, a contact cement 58 and a release sheet 59 may be utilized. The undulating character of the composite is achieved by superimposing on the surface layer 53 a second surface layer 60 characterized by an undulating pattern. The dimensions of the undulating second surface layer 60 may be the same as in the backing layer 43 in the construction of FIG. 7. While requiring an additional layer, the embodiment of FIG. 9 in some respects is more easily fabricated than that of FIG. 7 since it requires only the application of an undulating second surface layer to the essentially planar arrangement of FIGS. 2-4. Nevertheless, the benefits achieved are essentially equivalent to that of the composite of FIG. 8. Thus, the angle of incidence of a ray of light 61 impinging from a relatively distant source and refracted through layer 60 as ray 62, is reduced with correspondingly increased retroreflectivity (ray 63), provided the incidence angle is not reduced to more than about 30°-45°.

The presence of air pockets between the reflecting elements, such as the air spaces of channels 34 of FIGS. 1-4, and the air spaces 49 and 56 in FIGS. 7 and 9, respectively, permit internal reflection without the need for reflecting, metallized deposits on the cube corner reflecting portions of the reflecting elements. Of course, the materials of the retroreflective composite must be carefully selected to minimize loss of a hermetic seal, which could result in entry of moisture and soil into the air spaces. Metallizing of the reflecting faces is less desirable due to the added cost and the tendency of the metal itself to weather, with consequent loss of reflectivity. Moreover, a metallized surface tends to exhibit an undesirable grayness and limits the possibility of using distinctive coloring in some or all of the layers of the composite. Thus, the composite may be fully transparent or any portions thereof may be suitably colored, for example, red, green, amber or any combination thereof.

From the standpoint of refractive index, any optical quality plastic may be used for the various components of the retroreflective material, such as acrylics, polycarbonate, polybutyrate and the like. A refractive index of about 1.4–1.6 is usual. If desired, abrasion resistant coatings and transparent ink coatings may be applied to the surface layer of the retroreflective material.

The retroreflective material of the invention may be utilized in the form of strips or discrete markings of any pattern, and can be fastened by a variety of means to various surfaces, such as highway structures, motorcycle helmets, bicycles, and various warning devices, including traffic cones, school and railroad crossings, and the like.

In view of the foregoing description, it will be apparent that the invention is not limited to the specific details set forth therein for purposes of illustration, and that various other modifications are equivalent for the stated and illustrated functions without departing from the spirit and scope of the invention.

I claim:

1. In a retroreflective material, the combination of a transparent surface layer, a backing layer, and an array of reflecting elements between said layers, each of said reflecting elements having a rectangular base, two mutually perpendicular rectangular faces meeting said base at 45° angles, and two parallel triangular faces perpendicular to said rectangular faces, said triangular and rectangular faces defining a pair of cube corners therebetween, said reflecting elements being uniformly arranged with their bases adjacent said surface layer and their cube corners adjacent said backing layer, and wherein opposing triangular faces of adjacent elements are spaced apart to provide internal reflection therefrom.

2. A retroreflective material as in claim 1 wherein the refraction index of the reflective elements is about 1.4–1.6, the depth of the reflecting elements is about 2–200 mils, the length and width of the reflecting elements are about twice the depth, and the width of the spacing between said opposing triangular faces of the elements is about 1/10 to about 3 times the depth.

3. A retroreflective material as in claim 1 wherein the array of reflecting elements and the surface layer together form a unitary construction defined by a transparent film onto which has been formed said reflecting elements, and said backing layer is sealed to said transparent film at discrete locations.

4. A retroreflective material as in claim 3 wherein said reflecting elements are embossed into said film.

5. A retroreflective material as in claim 1 wherein said backing layer is sealed to said reflective elements at discrete locations, and the areas bounded by said spaced apart triangular faces and said backing layer define air pockets.

6. A retroreflective material as in claim 3 wherein said transparent film is formed in an undulating pattern, and the thickness of said backing layer varies correspondingly.

7. A retroreflective material as in claim 3 wherein said transparent film has a planar configuration, and said retroreflective material further includes an additional transparent surface layer material having an undulating pattern.

8. A retroreflective material as in claim 6 wherein the undulations of the undulating pattern are at an elevation of about 2–20 degrees.

9. A retroreflective material as in claim 7 wherein the undulations of the undulating pattern are at an elevation of about 2–20 degrees.

10. A retroreflective material as in claim 1 wherein the thickness of each of the surface and backing layers is about 2–200 mils.

* * * * *